United States Patent
Poling, Sr. et al.

(10) Patent No.: US 6,892,612 B2
(45) Date of Patent: *May 17, 2005

(54) TIRE UNIFORMITY MACHINE DRIVE ASSEMBLY

(75) Inventors: David Poling, Sr., Akron, OH (US); Richard L. Delmoro, Tallmadge, OH (US); David P. Krause, Hartville, OH (US)

(73) Assignee: Akron Special Machinery, Inc., Akron, OH (US)

( * ) Notice: Subject to any disclaimer, the term of this patent is extended or adjusted under 35 U.S.C. 154(b) by 185 days.

This patent is subject to a terminal disclaimer.

(21) Appl. No.: 10/368,093

(22) Filed: Feb. 18, 2003

(65) Prior Publication Data

US 2003/0159553 A1 Aug. 28, 2003

Related U.S. Application Data

(63) Continuation of application No. 09/849,824, filed on May 7, 2001, now Pat. No. 6,584,877.

(51) Int. Cl.[7] .......................... B23B 3/04; G01M 17/02
(52) U.S. Cl. .............................. 82/101; 82/165; 73/146; 73/460
(58) Field of Search .......................... 82/101, 165, 104, 82/147, 142, 150, 170, 903; 73/460, 146

(56) References Cited

U.S. PATENT DOCUMENTS

| | | | |
|---|---|---|---|
| 5,257,561 A | | 11/1993 | Folta ............................ 82/165 |
| 5,893,793 A | | 4/1999 | Nishio et al. .................. 451/49 |
| 5,992,227 A | * | 11/1999 | Jellison et al. ................ 73/146 |
| 6,308,566 B1 | * | 10/2001 | Matsumoto et al. .......... 73/462 |
| 6,578,275 B1 | * | 6/2003 | Delmoro et al. ............ 33/1 PT |
| 6,584,877 B1 | * | 7/2003 | Poling et al. ................. 82/101 |
| 6,772,626 B1 | * | 8/2004 | Engel et al. .................. 73/146 |

* cited by examiner

Primary Examiner—Jacob K. Ackun, Jr.
(74) Attorney, Agent, or Firm—Renner, Kenner, Greive, Bobak, Taylor & Weber

(57) ABSTRACT

A tire uniformity machine having a framework for receiving a tire to be tested, a rotatable chuck located within the framework and having a spindle driven by a motor directly coupled to the spindle to selectively cause rotation thereof, whereby the tire is chucked within the chuck assembly and caused to rotate by the motor. The motor is disposed in axial alignment with the spindle.

14 Claims, 4 Drawing Sheets

TIRE UNIFORMITY MACHINE DRIVE ASSEMBLY

RELATED PATENT APPLICATIONS

This application is a continuation of U.S. application Ser. No. 09/849,824 filed May 7, 2001 now U.S. Pat. No. 6,584,877.

FIELD OF THE INVENTION

In general, the present invention relates to tire uniformity machines. More particularly, the present invention relates to a drive assembly in a tire uniformity machine. Most particularly, the present invention relates to a spindle drive assembly in a tire uniformity machine.

BACKGROUND OF THE INVENTION

Generally, tire uniformity machines are used to test the characteristics of tires after production. This testing may include measurement of the dimensional characteristics of the tire and the forces on the tire at varying loads. To accomplish load testing, the tire is brought into the tire uniformity machine, mounted on a chuck, inflated and rotated by a drive assembly coupled to the spindle of the chuck while a load wheel is brought into contact with the periphery of the tire.

Previously, these drive assemblies have included a motor mounted on the tire uniformity machine at a distance from a spindle to which the load wheel or chuck was mounted. The motor is then coupled to the spindle by a belt or a chain to drive the spindle. For measurement purposes, a timing belt is typically used to couple the motor to the spindle. As is common in the art, the timing belt contains a number of cogs or teeth that mate with similar cogs on a cog wheel attached to the drive shaft of the motor. The fit between each cog is limited by machining tolerances introducing some error in the measurement of the spindle's rotation. Further, the cogs on the timing belt generate significant vibration as they are engaged, introducing additional error into the measurements taken at the tire.

These errors are exacerbated when either the cog wheel or timing belt have bad teeth. The presence of a bad tooth, i.e., one that is improperly sized or has been damaged or worn causing it to mesh imprecisely with mating teeth, may cause some slipping or other movement of the timing belt relative to the cog wheel or spindle and can often increase the magnitude of the vibration. The presence of a bad tooth is typically identified by a sudden increase in noise, often a growling sound, or by shaking created by operation of the machine. This increase occurs periodically as the bad tooth is engaged. As a practical matter, the vibration caused by the presence of teeth, which is increased when bad teeth are present, introduces error in the measurements taken by the tire uniformity machine. For instance, the teeth cause the rotational velocity of the spindle, as measured by the tire uniformity machine to appear not constant. In making the velocity measurement, the teeth on the timing belt cause ripples in the measured velocity, and bad teeth may cause a spike in this measurement.

In effect, errors created by the drive assembly essentially cause a false reading of the spindle's rotational velocity. Inasmuch as other measurements performed by the tire uniformity machine rely on the accurate measurement of these rotational velocities, the drive assembly errors migrate throughout the tire uniformity machine measurements, in effect, creating a false baseline on which further measurements are superimposed. As a consequence, the devices measuring the tire are actually measuring the tire as well as the motor thus preventing these devices from isolating the tire's characteristics.

As a separate matter, the prior art drive assemblies are bulky and less responsive in making changes in the rotational direction of the tire. As previously discussed, the typical drive assembly has a motor, cog wheel, and timing belt coupled to a spindle that drives the chuck. At times during the testing process, it is necessary to change the direction of rotation of the tire. In the majority of prior art system, machine tolerances, and the additional inertia of these components increases the amount of time necessary to reverse the motor and change the direction of the tire or loadwheel. While the period for changing the direction of the tire may be on the order of seconds or tenths of a second, these small periods accumulate with the large numbers of tires that are processed in a continuing production process in a given period of time. Reducing the time required to change direction during operation of the tire uniformity machine will result in the processing of a significant number of additional tires in a given period of time.

SUMMARY OF THE INVENTION

In light of the foregoing, at least one object of the present invention is to provide a drive assembly for a tire uniformity machine that has a reduced influence on the measurement of spindle velocity in the machine.

Another object of the present invention is to provide a drive assembly that directly drives the spindle without a timing belt and cog wheel assembly.

In accordance with at least one of these objects, the present invention provides a tire uniformity machine having a framework for receiving a tire to be tested, a rotatable chuck assembly located within the framework having a spindle driven by a motor assembly having a motor directly coupled to the spindle to selectively cause rotation thereof, whereby the tire is chucked within the chuck assembly and caused to rotate by the motor assembly for testing purposes.

The present invention further provides a tire uniformity machine having a framework for receiving a tire to be tested, a rotatable chuck assembly located within the framework, the chuck assembly including an upper chuck assembly and a lower chuck assembly movable in the axial direction to chuck a tire entering the framework for testing, the upper chuck assembly including a spindle axially supported by the framework but freely rotatable therein; a motor assembly directly coupled to the spindle, the motor assembly having an annular stator assembly receiving a portion of the spindle and a rotor assembly rotatable under a field generated by the stator assembly, the rotor assembly being keyed to the spindle, whereby application of a drive current to the stator assembly causes the spindle to rotate, whereby the tire is chucked within the upper and lower chuck assemblies and caused to rotate by energizing the motor assembly.

The present invention further provides a drive assembly in a tire uniformity machine having a framework for receiving a tire to be tested by application of simulated forces via a rotatable load wheel, the drive assembly including a spindle axially supported on the framework and freely rotatable therein; a motor assembly having an annular stator assembly defining a bore for receiving the spindle and a rotor assembly adjacent the stator assembly coupled to the spindle, whereby the stator and the spindle are caused to rotate by energizing the motor assembly.

Accordingly, production of a tire uniformity machine drive assembly of the character above-described becomes the principal object of this invention with other objects thereof becoming more apparent upon a reading of the following brief specification, considered and interpreted in view of the accompanying drawings.

DETAILED DESCRIPTION OF THE INVENTION

Figure 1:
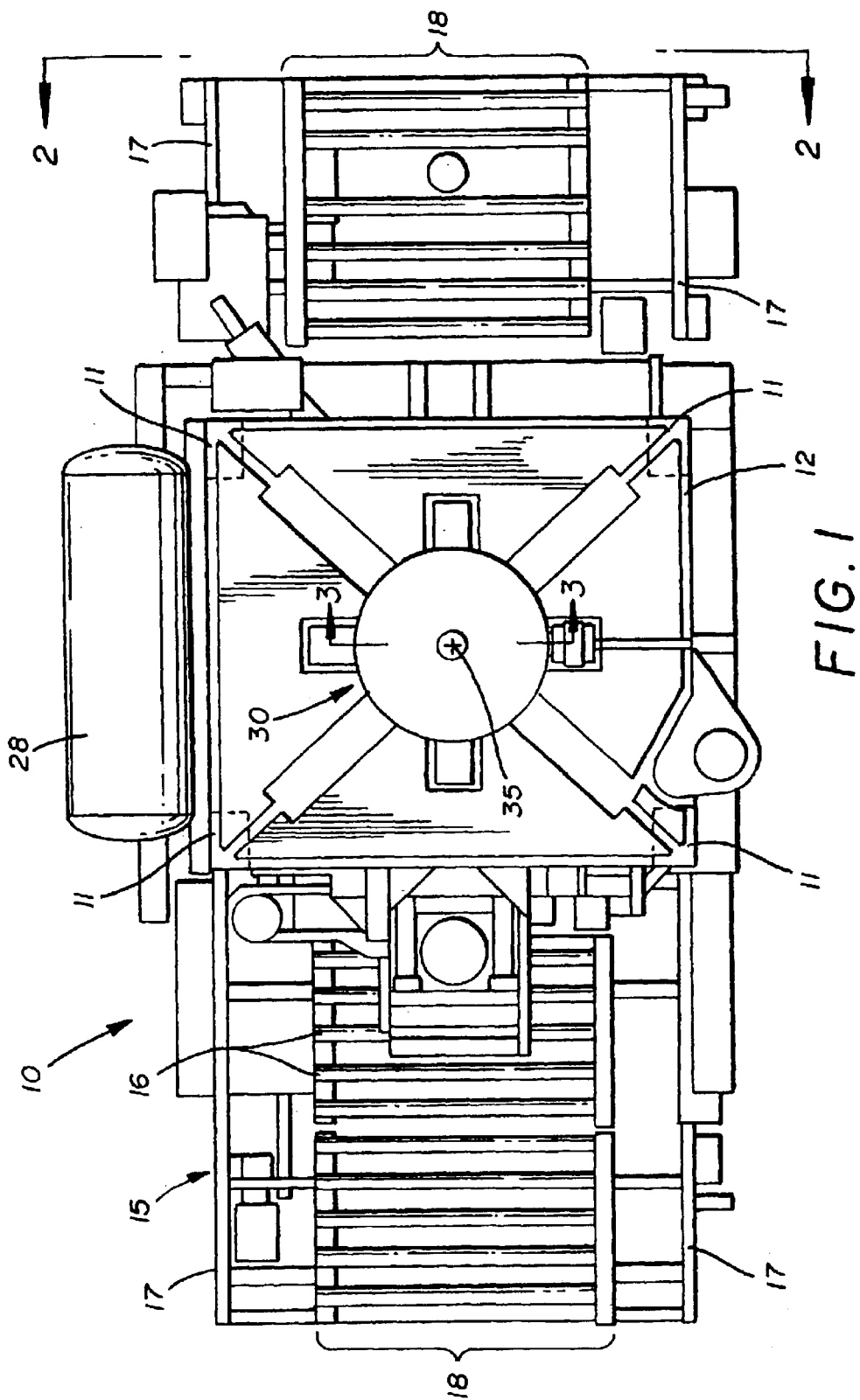
FIG. 1 is a top plan view of a tire uniformity machine according to the present invention.

As can be seen in FIG. 1 of the drawings, a tire uniformity machine, generally indicated by the numeral 10 in the figures, generally includes vertical side frame members 11, a generally horizontal top frame member 12, and generally horizontal bottom frame members 13 to form the framework F for the machine 10. Frame members 11, 12, 13 create a generally box-like structure within which a tire T is received and tested.

As best shown in FIG. 1, tire T may be delivered into the framework F of the machine 10 and removed therefrom after testing as by a conveyer, generally referred to by the numeral 15. Conveyer 15 may include a plurality of rollers 16 rotatably supported between parallel side members 17 forming a roller bed. The side members 17, 17 of conveyer 15 and side members 11, 11 of machine 10 are generally spaced to an extent such that they are capable of receiving tires of significantly varying diameter. Once the tire T is brought within the framework F of the machine 10, the tire T is chucked and prepared for testing.

Figure 2:
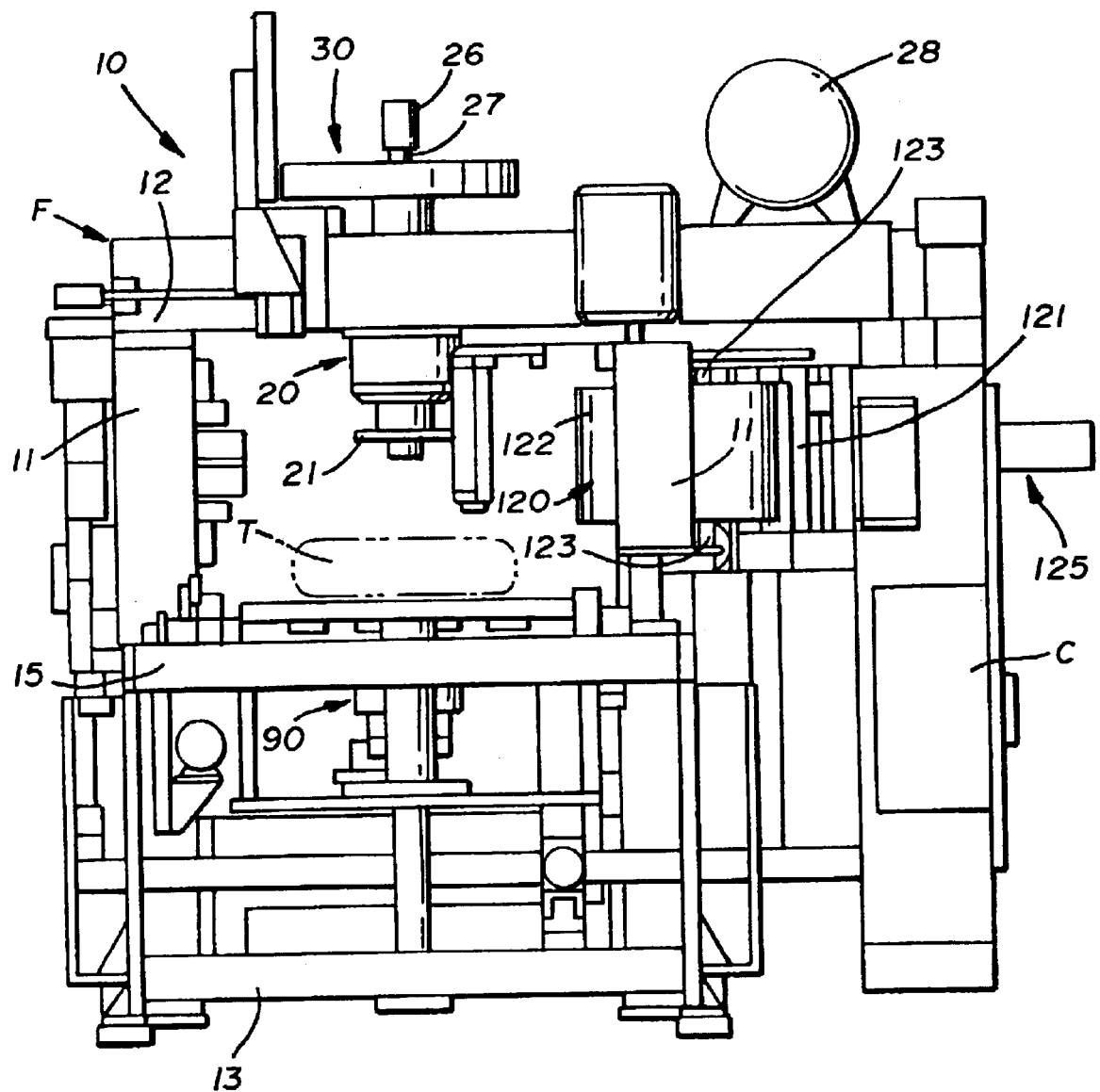
FIG. 2 is a front plan view thereof.
Figure 3:
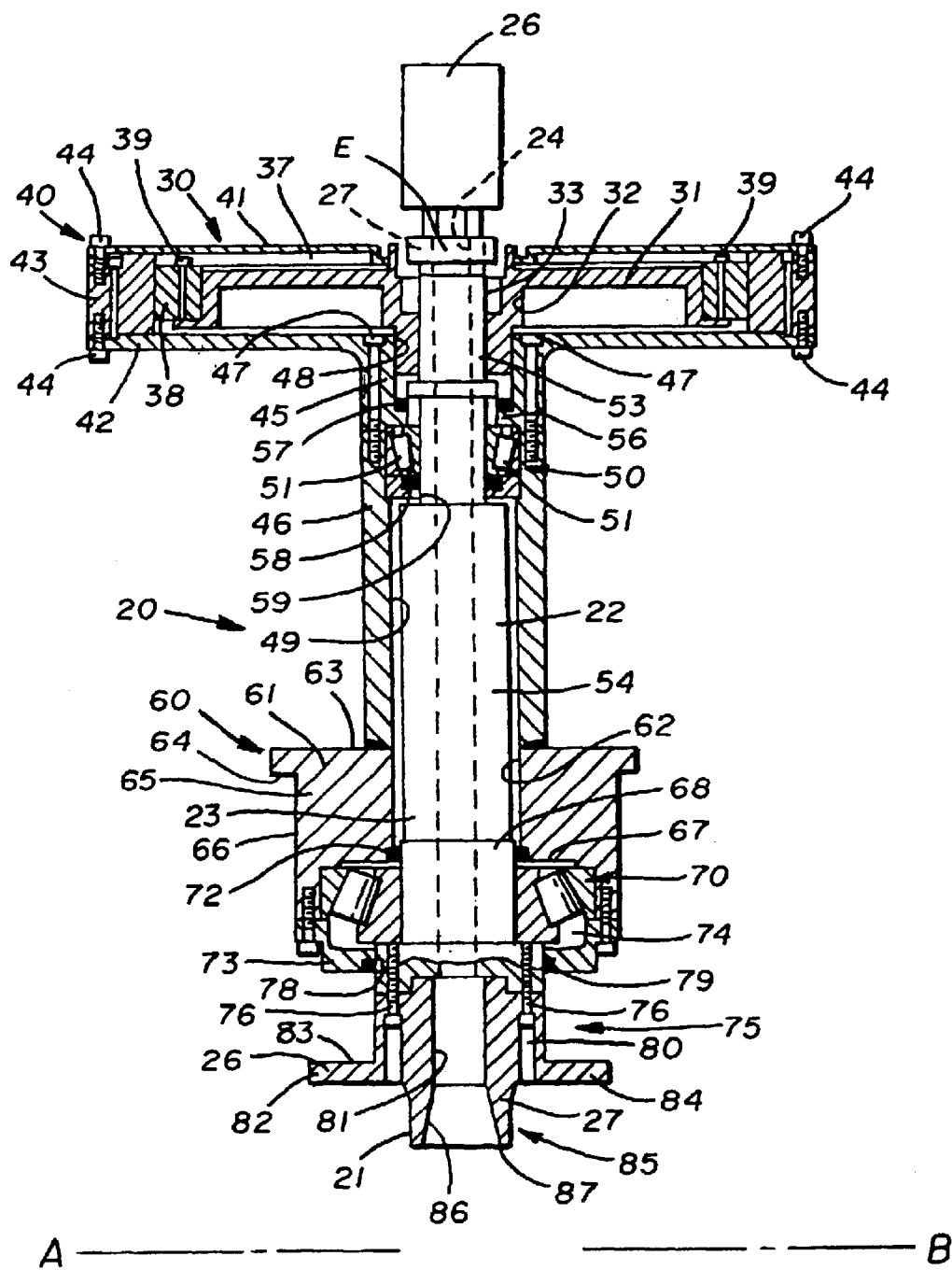
FIG. 3–3A is a partially broken away sectional view as taken along line 3—3 in FIG. 1 depicting a direct drive motor assembly and chuck assembly of the present invention in more detail.

In that regard, the upper frame members 12 carry an upper chuck assembly, generally referred to by the numeral 20, shown in FIG. 3, which generally includes a chuck 21 and a spindle 22. The spindle 22 may be made hollow defining a passage 24 for transporting air to and from the tire T to maintain proper inflation thereof. To that end, a union 26 may be rotatably coupled to a first end 27 of spindle 22 such that the spindle 22 may rotate within union 26 facilitating delivery of air to the tire T, from an air supply 28 (See FIGS. 1 and 2), during rotation of the upper chuck assembly 20.

The upper chuck assembly 20 is directly driven by a motor assembly, generally indicated by the numeral 30, operatively coupled to the spindle 22 near the first end 27 thereof. It will be appreciated a motor assembly 30 may be coupled to spindle 22 at other locations, and alternatively may be used to drive the lower chuck assembly 90 to similarly rotate tire T.

Motor assembly 30 includes a brush-less motor 31 having an annular stator assembly 32 defining a bore within which the rotor assembly 33 and spindle 22 are received. To directly drive spindle 22, rotor assembly 33 is rotationally coupled to spindle 22, as by a key. Motor 30 is powered by servo drive electronics which control speed and direction with less cogging compared to prior art motor assemblies. The motor assembly 30 may include such a servo drive, which produces a synthetic quadrature encoder output to be used by the controller C to measure the speed and distance of rotation in place of a separate encoder. Alternatively, a separate encoder or resolver, collectively referred to by the letter E, such as, a hollow shaft encoder, may be used to measure the shaft speed and the amount of shaft rotation. The hollow shaft encoder may be a sign encoder. The synthetic quadrature encoder and servo drive combination is believed to produce precise velocity and position control over a wide range of speeds, for example, 0–1000 rpm, which becomes important for an instantaneous radius measurement.

Motor assembly 30 is supported on top member 12 of framework F and may be secured by bolts 34. As best shown in FIGS. 1 and 2 of the drawings, motor assembly 30 may be centered relative to the side members 11 and located at about the center 35 of top frame member 12. By centering the motor assembly 30, the moments created by the motor assembly 30 on the frame members 11 upon startup cancel each other. It will be appreciated that in previous machines, the motor assembly was located a distance from the frame center and often mounted outside of the frame members.

Motor assembly 30 may have an annular cover plate 37 secured to the wall 38 of motor 31, as by bolts 39, protecting the motor's internal components from dust and other debris. A housing, generally referred to by the numeral 40, surrounds motor 31 to further protect the motor 31. As shown, housing 40 may have a cover portion 41, a base portion 42, and an annular wall portion 43, which may be fastened together in any conventional manner including the radially spaced bolts 44 illustrated in the drawings. Base portion 42 may be provided with a sleeve 45 extending axially downwardly to mate with and attach, as by bolts 47, to a spindle sleeve 46. Both sleeve 45 and spindle sleeve 46 respectively define bores 48, 49 for receiving the spindle 22 and a first bearing assembly 50, which includes roller bearings for rotatably receiving spindle 22. Thrust bearings 51 may be used and oriented to resist an axial force generated by motor assembly 30.

The spindle 22 may be necked near first bearing assembly 51 forming a narrow portion 53 adjacent the central portion 54 of spindle 22 such that an annular rotor assembly 33 having an internal diameter smaller than the external diameter of central portion 54 may be coupled to the spindle 22 and freely rotatable within the aperture defined by the stator assembly 32. A radial flange 56 may extend from the narrow portion 53 or be formed by a locknut and washer attached to spindle 22 between the rotor assembly 33 and first bearing assembly 50. A first seal 57 is located adjacent radial flange 56 sealing off the bearing assembly 50 from the motor assembly 30. A second seal 58 seals off the bearing assembly 50 from the central portion 54 of spindle 22. The narrow portion 53 extends axially downwardly through the aperture 59 defined by the second seal 58 entering the spindle bore 49.

Within the spindle bore 49, the central portion 54 of spindle 22 expands radially outwardly, relative to narrow portion 53, to substantially fill the confines of the bore 49. Central portion 54 extends into an upper spindle housing assembly 60 located adjacent to the spindle bore 49 and is freely rotatable therein. A flange portion 61 of upper spindle housing assembly 60 is located adjacent spindle sleeve 46 and defines an upper spindle housing bore 62 having substantially the same diameter as spindle bore 49 for receiving the remainder of central portion 54 of spindle 22. Flange portion 61 extends radially outwardly of spindle sleeve 46 defining an annular flattened shoulder 63 adjacent spindle sleeve 46. Body portion 65 of upper spindle housing 60, extends axially downwardly from flange portion 61 and is radially indented therefrom defining a second flattened shoulder 64 on the underside of flange portion 61. From second shoulder portion 64, body portion 65 extends axially downward defining a radial surface 66 on the exterior of body portion 65. Within upper spindle housing assembly 60, body portion 65 defines a compartment 67 extending radially outwardly from the upper spindle housing bore 62 for receiving an enlarged portion 68 of spindle 22 and a second bearing assembly, generally indicated by the numeral 70.

Second bearing assembly 70 is substantially identical to the first bearing assembly 50 with the exception of the enlarged portion 68 of spindle 22 taking the place of the radially extending sleeve 56. As in the case of first bearing assembly 50, thrust bearings 71 may be used to resist axial forces generated during testing including those from motor assembly 30, the tire T, or lower chuck assembly 90. Accordingly, thrust bearing 71 may be oriented to receive these loads. A seal 72 is located adjacent the enlarged portion 68 and compartment 67 to cordon off the bearing assembly 70 from the upper spindle housing bore 62. A cap plate 73 defines the lower portion 74 of compartment 67 and is attached to upper spindle housing assembly 60 as by bolts.

A cap assembly, generally indicated by the numeral 75 extends axially downwardly through cap plate 73 and is attached to spindle 22, as by bolts 76. Cap assembly 75 is of greater radial dimension than enlarged portion 68 of spindle 22 and is received within a cap bore 78 of cap plate 73. A seal 79 is provided adjacent the cap bore 78 and cap assembly 75 to seal compartment 67.

Cap assembly 75 has an annular body 80 defining a cap bore 81 in communication with air passage 24. A cap flange 82 extends radially outwardly from a lower end of the cap assembly 75 defining first and second flattened shoulders 83, 84. A receiver, generally indicated by the numeral 85, extends axially downwardly from body 80 and radially interiorly of shoulder 84 defining an outwardly tapered receiving bore 86 that opens externally of upper chuck assembly 20 at an end 87. The outwardly tapered bore 86 is sized and shaped to receive a nose located on the lower chuck assembly 90, as described more completely below.

A lower chuck assembly 90, (FIG. 3A) is shown mounted on lower frame members 13, 13 and is at least partially supported on a shaft 91 which is attached to hydraulic unit 92. Hydraulic unit 92 conventionally includes a piston 93 and cylinder 94 operable to raise and lower the chuck assembly 90. In other words, the hydraulic unit 92 may axially move the lower chuck assembly 90 toward or away from the upper chuck assembly 30. In this way, the tire T can be chucked between the upper and lower chuck assemblies 20, 90 for testing purposes after being moved into the machine 10 along conveyor 15.

Lower chuck assembly 90 is similar to upper chuck assembly 20 with the exception that it is not driven directly by a motor assembly 30 in the form of the invention illustrated. Lower chuck assembly 90 is freely rotatable, and rotates under torque generated by motor assembly 30 acting through the upper chuck assembly 20 and the chucked tire. A nose assembly 95 extends upwardly from lower chuck assembly 90 having an annular end 96 defining a nose bore 97 corresponding to cap bore 81. The exterior walls 98 of end 96 are inwardly sloped to mate with the interior walls of receiver assembly 85. Nose assembly 95 may be slideably mounted within lower chuck assembly 90 such that it may be adjusted axially for tires having different bead spacings.

Figure 3A:
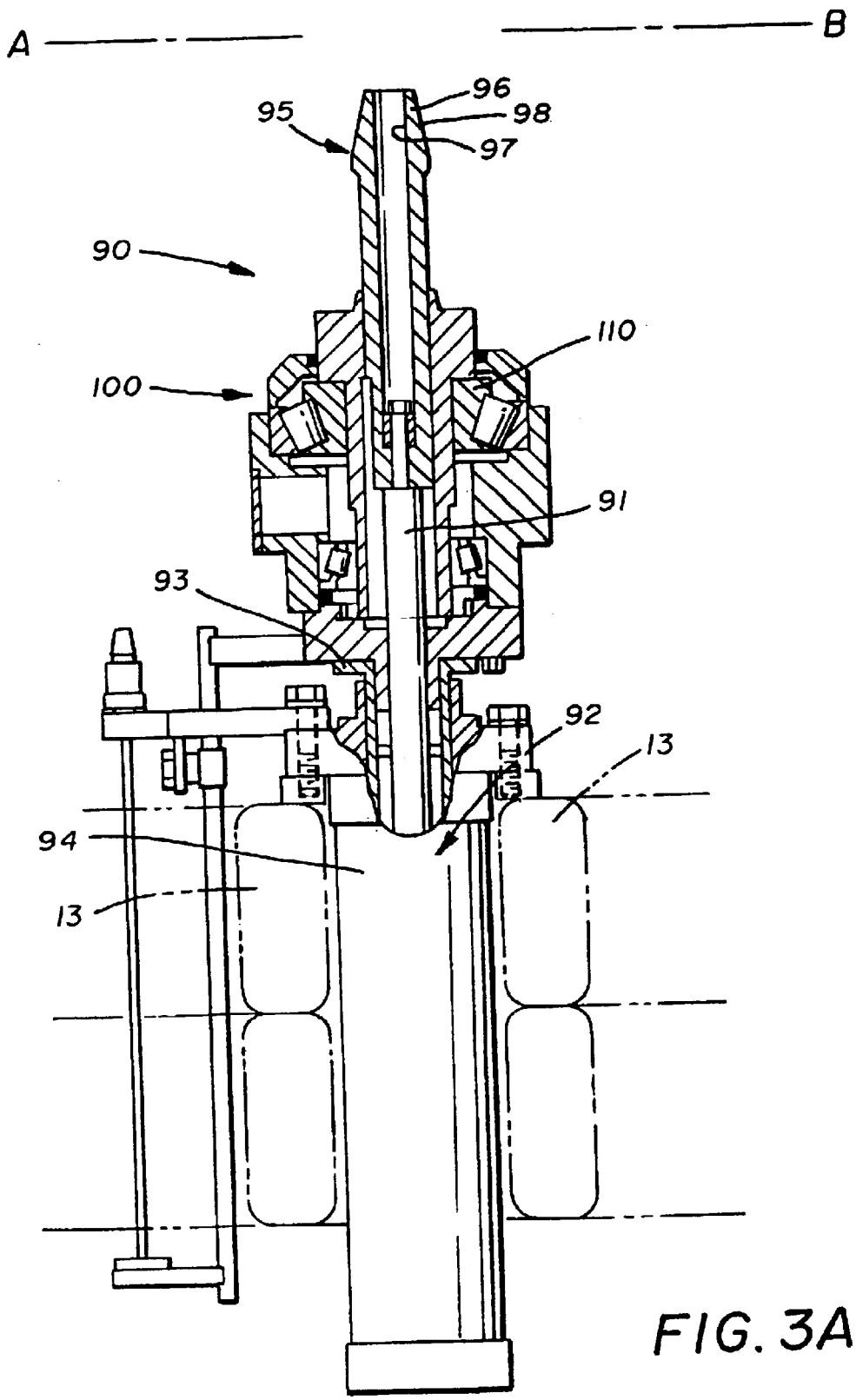

As shown in FIG. 3A, nose assembly 95 is received within a lower chuck housing assembly, generally indicated by the numeral 100, which is similar to the housing assembly of the upper chuck 20, described above, and, thus, is described only in general terms. As shown, nose assembly 95 is made rotatable by a bearing assembly 110.

When a tire T is received within the machine 10, the lower chuck assembly 90 may be moved axially to chuck the tire between the upper and lower chuck assemblies 20, 90 in preparation for testing. It will be appreciated that when the lower chuck assembly 90 is in its retracted position, i.e., below the conveyor assembly 15, the tire T may be moved into registry with the lower chuck 90 along conveyor 15. The lower chuck assembly 90 is then elevated so that the tire T engages the lower chuck housing portion 75 of the upper chuck assembly 20 to firmly seat the tire. The tire T is then inflated to the desired inflation pressure by air directed from supply 28 through air passage 24. Once inflated, the tire T is rotated and a load wheel, described below, is moved into engagement with the tire T to perform testing thereon.

A load wheel assembly, generally indicated by the numeral 120, is also provided and is carried by a carriage, generally referred to by the numeral 121, which may be mounted on the frame F. The load wheel assembly 120 includes a load wheel 122 rotatably mounted on spindles 123, 123 located on carriage 121. The spindles 123, 123 have associated with them load cells (not shown) which are used to measure certain characteristics of the tire T, as will be explained. The carriage 121 is movable toward and away from the tire T under the power of a load wheel motor assembly, generally indicated by the numeral 125.

During operation, tire T is brought into the tire uniformity machine 10 along conveyor 15. Once the tire T is in registry with the chuck assembly 20,90, the tire T is chucked and rotated by the motor assembly 30. The load wheel, 122 is brought in to contact with the tire T such that it rotates with tire T. The load cells associated with the load wheel 122 measure forces transmitted from the tire T to the load wheel 122 and relay this information to a controller C. These forces, along with other measurements made by the machine 10, allow controller C to assess the characteristics of the tire T and make corrections, as necessary.

While a full and complete description of one embodiment of the present invention has been set forth in accordance with the dictates of the Patent Statutes, it should be understood that modifications can be resorted to without departing from the spirit hereof, and to appreciate the scope of the invention reference should be made to the following claims.

What is claimed is:

1. A tire uniformity machine for testing tire, comprising:
   a) a framework for receiving a tire to be tested;
   b) a motor assembly including a motor carried by said framework;
   c) a rotatable chuck assembly disposed within said framework;
   d) said rotatable chuck assembly including a spindle directly coupled to said motor for selectively rotating said chuck assembly, wherein said motor assembly has a stator assembly defining a bore; said spindle being received within said bore; and a rotor assembly disposed adjacent said stator assembly and coupled to said spindle
      1) whereby said tire to be tested may be mounted on said rotatable chuck assembly and caused to rotate by said motor for testing purposes.

2. The tire uniformity machine of claim 1, wherein said spindle has a narrow portion adjacent said stator assembly to receive said rotor assembly.

3. The tire uniformity machine of claim 1, wherein said motor assembly is centrally located within said framework.

4. The tire uniformity machine of claim 1, wherein said framework includes four side members, and wherein the center of said motor assembly is located equidistant from each said side member.

5. The tire uniformity machine of claim 1, wherein said motor assembly includes a brushless motor having an annular stator assembly mounted on said framework; and a rotor assembly freely rotatable under force of an electric field generated by said stator assembly.

6. The tire uniformity machine of claim 5, wherein said spindle has a first portion and a second narrower portion having a diameter less than the main portion located adjacent thereto; and said rotor assembly is coupled to said spindle at said narrow portion.

7. The tire uniformity machine of claim 6 further comprising a first bearing assembly operable with said spindle to allow free rotation thereof, said first bearing assembly being located axially outwardly of said rotor assembly.

8. The tire uniformity machine of claim 7, wherein said first bearing assembly includes radially spaced roller bearings adjacent said spindle.

9. The tire uniformity machine of claim 8, wherein said roller bearings are thrust bearings.

10. A drive assembly in a tire uniformity machine for testing tires, having a framework for receiving a tire to be tested by application of simulated forces via a rotatable load wheel, the drive assembly comprising:

a) a spindle axially supported on the framework and freely rotatable therein;

b) a motor assembly having an annular stator assembly defining a bore for receiving the spindle; and c) a rotor assembly adjacent said stator assembly coupled to said spindle, whereby the spindle is caused to rotate by energizing said motor assembly.

11. The drive assembly of claim 10, wherein said motor assembly comprises a brushless motor.

12. The drive assembly of claim 10 wherein said spindle has a narrow portion, adjacent a central portion, said narrow portion being received within said bore, said rotor assembly being coupled to said narrow portion.

13. The drive assembly of claim 10 wherein said spindle is rotatably supported on a first bearing assembly located axially outward of said motor assembly, said first bearing assembly comprising a plurality of roller bearings operative with said spindle.

14. The drive assembly of claim 13 wherein said roller bearings are thrust bearings oriented to resist axial movement of said spindle caused by said motor assembly.

* * * * *